(12) United States Patent
Carrick (10) Patent No.: US 6,993,459 B2
(45) Date of Patent: Jan. 31, 2006

(54) EXTINCTION RATIO CALCULATION AND CONTROL OF A LASER

(75) Inventor: John C. Carrick, Wakefield, MA (US)

(73) Assignee: Tellabs Operations, Inc., Lisle, IL (US)

( * ) Notice: Subject to any disclaimer, the term of this patent is extended or adjusted under 35 U.S.C. 154(b) by 0 days.

(21) Appl. No.: 09/905,948

(22) Filed: Jul. 17, 2001

(65) Prior Publication Data

US 2003/0018453 A1 Jan. 23, 2003

(51) Int. Cl.
*G01S 5/0683* (2006.01)

(52) U.S. Cl. .................... 702/189; 702/57; 702/66; 372/29.01; 372/38.02

(58) Field of Classification Search ........... 702/189, 702/190, 196, 57, 66, 70, 71, 60, 85, 124, 702/127; 372/25, 29.01, 29.011, 29.014–29.015, 372/38.01–38.02, 38.07; 359/180, 181, 185
See application file for complete search history.

(56) References Cited

U.S. PATENT DOCUMENTS

| | | | | |
|---|---|---|---|---|
| 4,200,861 A | * | 4/1980 | Hubach et al. ............. | 382/216 |
| 4,864,649 A | * | 9/1989 | Tajima et al. .............. | 359/181 |
| 4,998,111 A | * | 3/1991 | Ma et al. .................... | 342/352 |
| 5,502,298 A | * | 3/1996 | Geller ........................ | 250/205 |
| 5,535,038 A | * | 7/1996 | Hinch ........................ | 359/180 |
| 5,617,237 A | * | 4/1997 | Bogdan et al. ............. | 359/180 |
| 5,850,409 A | | 12/1998 | Link ......................... | 372/38.01 |
| 5,974,063 A | * | 10/1999 | Yoshida ..................... | 372/38.02 |
| 6,014,235 A | * | 1/2000 | Norte ......................... | 359/109 |
| 6,101,213 A | * | 8/2000 | Van Allen .................... | 375/130 |
| 6,115,113 A | * | 9/2000 | Flockencier ................. | 356/5.01 |
| 6,256,329 B1 | * | 7/2001 | Ishizuka et al. ............. | 372/38.02 |
| 6,292,497 B1 | * | 9/2001 | Nakano ....................... | 372/29.015 |
| 6,314,393 B1 | * | 11/2001 | Zheng et al. ................ | 704/223 |
| 6,414,974 B1 | * | 7/2002 | Russell et al. ............. | 372/38.02 |
| 6,477,275 B1 | * | 11/2002 | Melikian et al. ........... | 382/217 |
| 6,546,345 B1 | * | 4/2003 | Ghiasi ........................ | 702/67 |
| 2002/0027690 A1 | * | 3/2002 | Bartur et al. ............... | 359/152 |
| 2002/0141515 A1 | * | 10/2002 | Enam et al. ................. | 375/340 |
| 2002/0161737 A1 | * | 10/2002 | Chi et al. .................... | 707/1 |

FOREIGN PATENT DOCUMENTS

| | | | | |
|---|---|---|---|---|
| JP | 01183872 A | * | 7/1989 | |
| JP | 02226001 A1 | * | 9/1990 | |
| JP | 04276673 A | * | 10/1992 | |

* cited by examiner

*Primary Examiner*—Marc S. Hoff
*Assistant Examiner*—Jeffrey R West
(74) *Attorney, Agent, or Firm*—Fitzpatrick, Cella, Harper & Scinto (57) ABSTRACT

A laser driver outputs a data protocol signal as controlled by an extinction control signal. The data protocol signal has a header including first and second bit patterns. A laser outputs an optical signal in response to being excited by the data protocol signal. The first and second bit patterns are measured and used to calculate an extinction ratio. The calculated extinction ratio is compared with a desired extinction ratio to generate the extinction control signal.

30 Claims, 6 Drawing Sheets

EXTINCTION RATIO CALCULATION AND CONTROL OF A LASER

FIELD OF THE INVENTION

The invention is in the field of optical telecommunications, and more particularly, pertains to calculating the extinction ratio of a module laser used in optical communications, and controlling the laser as a function of the calculated extinction ratio.

BACKGROUND OF THE INVENTION

Optical signals carry information with on/off keying. Due to the physics of the turn on transition wavelength chrip is a problem for direct modulated lasers. One way of minimizing chrip is to make the OFF state not completely off. The ratio of ON to not completely OFF is known as the extinction ratio. The extinction ratio is a useful measurement for an optical signal transmitter. One technique for measuring extinction ratio utilizes an expensive analyzer having a fast response time for performing optical to electrical conversion.

Another technique for measuring extinction ratio is set out in U.S. Pat. No. 5,502,298 to Geller. Geller is directed to a circuit for controlling an extinction ratio of a laser whose temperature can change over time. The circuit includes first and second feedback loops which monitor a LOW output power of the laser during a first frame training pulse and a HIGH laser output power during a second frame training pulse. The LOW power output is compared to a present dynamic LOW power reference, and a LOW bias current applied to the laser is incrementally increased or decreased so as to keep this LOW power output toggling about this LOW reference. Similarly, the HIGH power output is compared to a HIGH power reference, and a modulation current for the laser is incrementally increased or decreased to keep the HIGH laser output power toggling about this HIGH reference. Preferably, the training pulse is sent once per frame thus enabling both the LOW and HIGH laser output powers to be kept constant regardless of whatever dynamic variables may change over time thus keeping the laser extinction ratio constant.

SUMMARY OF THE INVENTION

It is an aspect of the invention to calculate an extinction ratio of a laser based on detected bit patterns in a repetitive section of a data protocol signal which is output from the laser.

It is another aspect of the invention to calculate an extinction ratio on a laser based on detected bit patterns in a repetitive section of a data protocol signal which is output from the laser, and to compare the calculated extinction ratio with a desired extinction ratio to generate an extinction control signal for controlling the extinction ratio of the laser.

It is another aspect of the invention that a laser driver outputs a data protocol signal as controlled by an extinction control signal. The data protocol signal has a repetitive section including a first sub-section having a first bit pattern and a second sub-section having a second bit pattern which is different than the first bit pattern. A laser outputs an optical signal in response to being excited by the data protocol signal, with the optical signal being converted to an electrical signal which is low-pass filtered to produce a doublet signal based on the first and second bit patterns. A sequence of the doublet signals are convolved with a reference doublet signal to produce a convolved doublet signal, with a peak of the convolved doublet signal being measured, and used to calculate an extinction ratio in accordance with a predetermined formula. The calculated extinction ratio is compared with a desired extinction ratio to generate the extinction control signal.

It is still another aspect of the invention that a laser driver outputs a data protocol signal as controlled by an extinction control signal. The data protocol signal has repetitive sections including a first sub-section having a first bit pattern having a preponderance of ONE bits and a second sub-section having a second bit pattern having a preponderance of ZERO bits. A laser outputs an optical signal in response to being excited by the data protocol signal, with the optical signal being converted to an electrical signal which is low-pass filtered to produce a doublet signal based on bits in the preponderance of ONE bits in the first bit pattern and the preponderance of ZERO bits in the second bit pattern. A sequence of the doublet signals are convolved with a reference doublet signal to produce a convolved doublet signal, with a peak of the convolved doublet signal being measured, and used to calculate an extinction ratio in accordance with a predetermined formula. The calculated extinction ratio is compared with a desired extinction ratio to generate the extinction control signal.

DETAILED DESCRIPTION

An extinction ratio of a laser is calculated based on the repetitive nature of the bit pattern in the header of the data protocol signal used to excite the laser. For example, the data protocol signal has a header section including a first sub-section having a first predetermined bit pattern and a second sub-section having a second bit pattern which is different than the first bit pattern.

One such data protocol signal is the OC48 SONET (Synchronous Optical NETwork) signal. As previously stated, the extinction ratio is the ON/OFF ratio of an optical signal. For OC48 SONET, the ON/OFF cycle requires instrumentation with bandwidth in excess of 10 GHZ. Utilizing known bit patterns within the SONET framing bytes (header) provides a good indication that extinction ratio can be determined with bandwidths much less than 10 GHz. The framing bytes in the SONET protocol overhead have a repetitive F6-28 pattern that provides a reliable signal at bandwidths of approximately 6 to 12 MHz. Other SONET protocols such as OC3, OC12, OC46 and OC192 have framing bytes having a like repetitive nature to the OC48 protocol. The European optical protocol SDH also exhibits a like repetitive nature in the framing bytes of the protocol.

Figure 1:
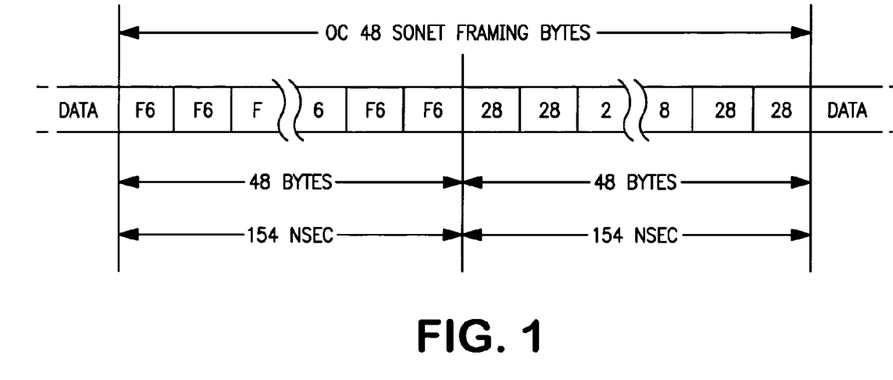
FIG. 1 is a waveform of a data protocol signal which is used to excite a laser.

FIG. 1 is waveform of the OC48 SONET protocol showing A1 framing bytes and A2 framing bytes in the repetitive sections between data bytes. A1 and A2 each repeat 48 times, with the 48 repetitions each occurring in 154 nsec. These repetitions also occur repetitively, spaced at intervals of 125 μsec, or equivalently at a repetition rate of 8 KHz. The hexadecimal representation for each A1 and A2 byte is as follows:

A1=11110110 (0X F6)

A2=00101000 (0X 28)

The A1 framing byte has a preponderance of ONE bits. Specifically, six ONE bits and two ZERO bits. The A2 framing byte has a preponderance of ZERO bits. Specifically, two ONE bits and six ZERO bits.

Figure 2:
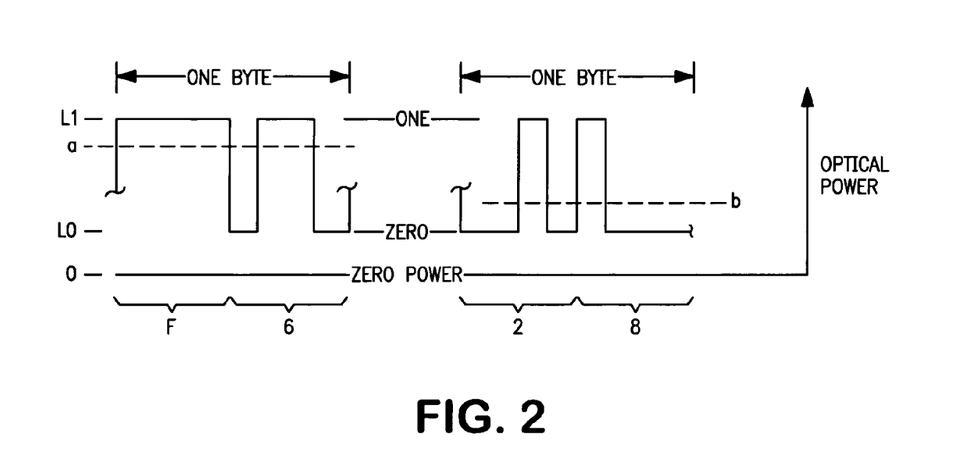
FIG. 2 illustrates waveforms of framing bytes in the data protocol signal of FIG. 1.

FIG. 2 is a waveform illustrating one byte of each of the A1 (F6) and A2(28) framing bytes of the OC48 SONET protocol.

In FIG. 2 power levels of A1 and A2 are plotted versus time. Power levels are defined as follows:
L1=power level of a ONE bit
L0 =power level of ZERO bit
a=average power during A1(F6) bytes $$a = \frac{6(L1) + 2(L0)}{8} = \frac{3L1 + L0}{4}$$

b=average power during A2(28) bytes $$b = \frac{6(L0) + 2(L1)}{8} = \frac{3L0 + L1}{4}$$

The extinction ratio (E) is defined as:

1) $E = \frac{L1}{L0}$ where:

2) $L0 = \frac{3b - a}{2}$

3) $L1 = \frac{3a - b}{2}$

4) $E = \frac{3a - b}{3b - a}$

The extinction ratio E as calculated above will subsequently be used to derive an extinction control signal to control the extinction ratio of a laser. The calculations shown here for E, a, b, L1, and L0 are peculiar to first and second sub-sections having average bit densities found in SONET A1 and A2 bytes. The equations would modify for other protocols with differing ONEs densities.

Figure 3:
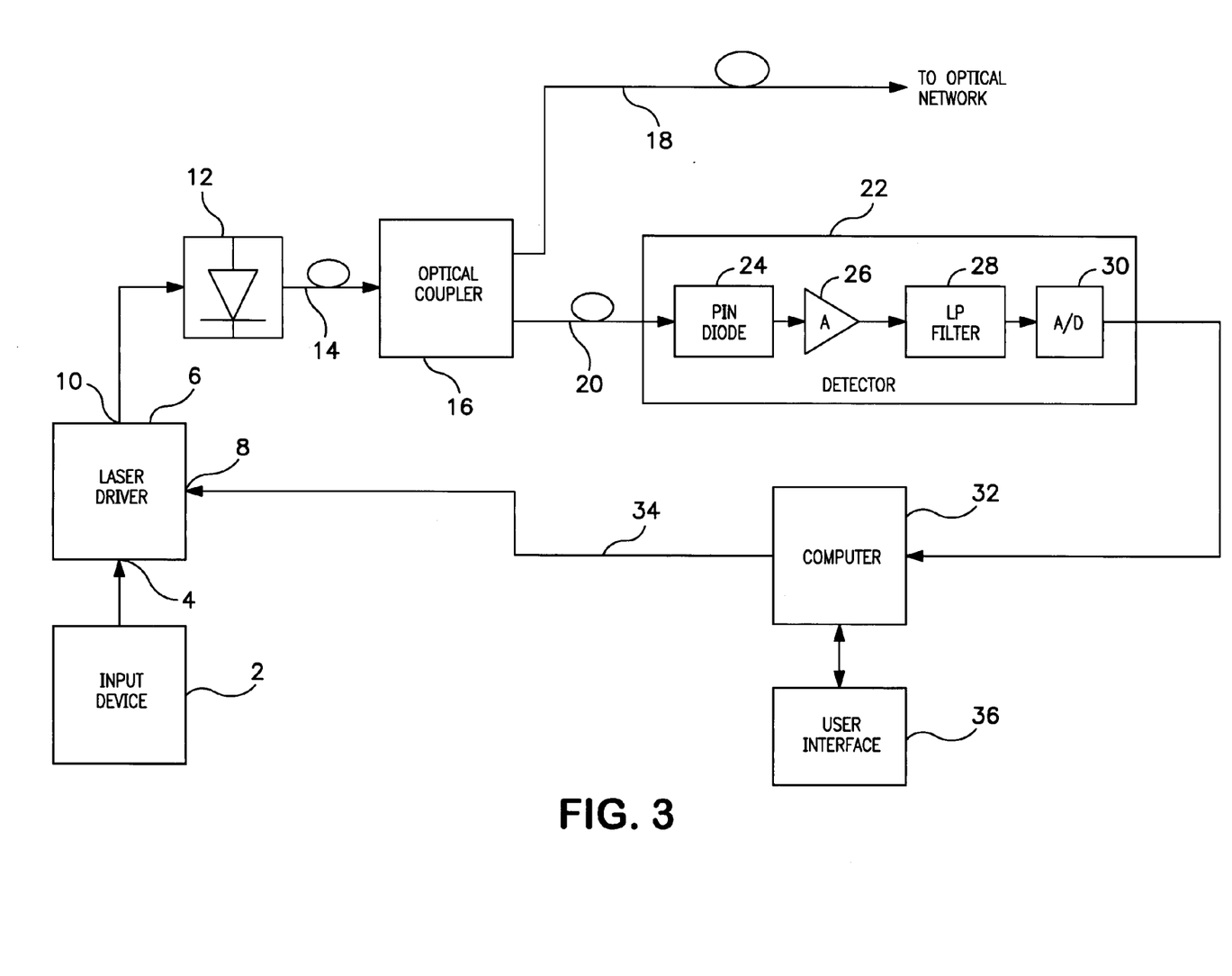
FIG. 3 is a block diagram of an optical telecommunications system which measures, calculates and controls an extinction ratio of a laser in the system.

FIG. 3 is a block diagram of an optical telecommunication system which measures, calculates and controls an extinction ratio of a laser in the system in accordance with the principles set out above. An input device 2, such as a OC48 SONET bit source provides a data protocol signal as shown in FIG. 1 to a data input 4 of a laser driver 6, whose extinction control ratio is controlled in accordance with an extinction control signal applied to an extinction control input 8. The laser driver 6 outputs at an output 10 an output signal suitable for modulating a laser's light output. The output signal is applied to a laser 12 which outputs an optical protocol signal on optical fiber 14 to an optical coupler 16, for example a splitter. The optical coupler 16 outputs on an optical fiber 18 on the order of 95% of the optical protocol signal to an optical network (not shown). On the order of 5% of the optical protocol signal is provided from the optical coupler 16 via optical fiber 20 to a detector 22 which detects the first predetermined bit pattern (A1 bytes) and the second predetermined bit pattern (A2 bytes) in the data protocol signal.

Figure 4:
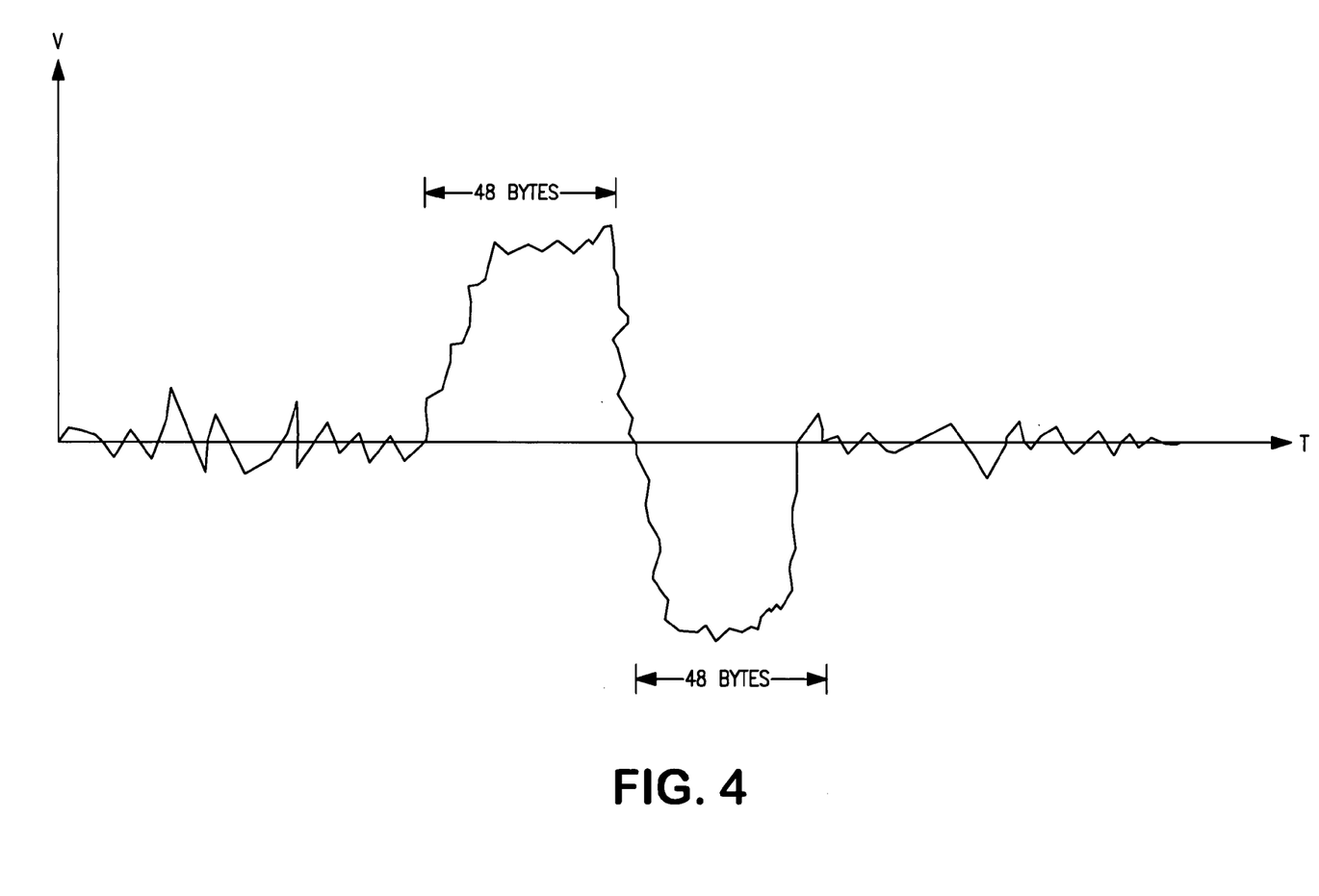
FIG. 4 is a waveform of a doublet signal detected in the system shown in FIG. 3.

The detector 22 includes a pin diode 24, which converts the optical data protocol signal to an electric current, which is amplified by an amplifier 26 resulting in an analog voltage representation of the data protocol signal. A low-pass filter 28 has a bandpass on the order of 6 MHz in order to pass at least a portion of the analog data protocol corresponding to the multi-byte average of A1 framing bytes and a portion of the multi-byte average of the A2 framing bytes. This will result in a voltage corresponding to the "a" level during the A1 (or 0xF6) bytes as shown in FIG. 2. It will also result in a voltage corresponding to the "b" level during the A2 (or 0x28) bytes as in FIG. 2. The average response of sequences of data bytes outside the A1 and A2 framing bytes will also be transmitted by this filter. However, the response from bytes outside of A1 and A2 bytes will be usually non-repetitive, whereas the A1 and A2 bytes are repetitive at a 125 microsecond interval. If many time blocks of 125 micro seconds from the filter output are aligned and averaged, the result is an analog doublet signal as shown in FIG. 4, having a positive portion corresponding to filtering the A1 framing bytes, and a negative portion corresponding to filtering the A2 framing bytes. An A/D converter 30 converts the low pass filter analog signal to a digital signal which is applied to a computer 32 for processing. The processing has the affect of aligning and averaging 125 micro second time blocks, searching this averaged output for the doublet shape of FIG. 4, and reading the high "a" level and the low "b" level from that doublet shape. Using these levels, the extinction ratio can be calculated as described above. From this calculated value and an input target extinction ratio, the processor can generate the extinction control signal on line 34 which is applied to the extinction control input 8 of laser driver 6 for controlling the extinction ratio. A user interface 36 provides a reference doublet signal and a desired extinction ratio and other control signals to the computer 32 for computing the extinction control signal. The computer 32 includes at least a Central Processing Unit (CPU), a memory, and an input/output device (I/O)(not shown), as is well known to those skilled in the art.

Figure 5:
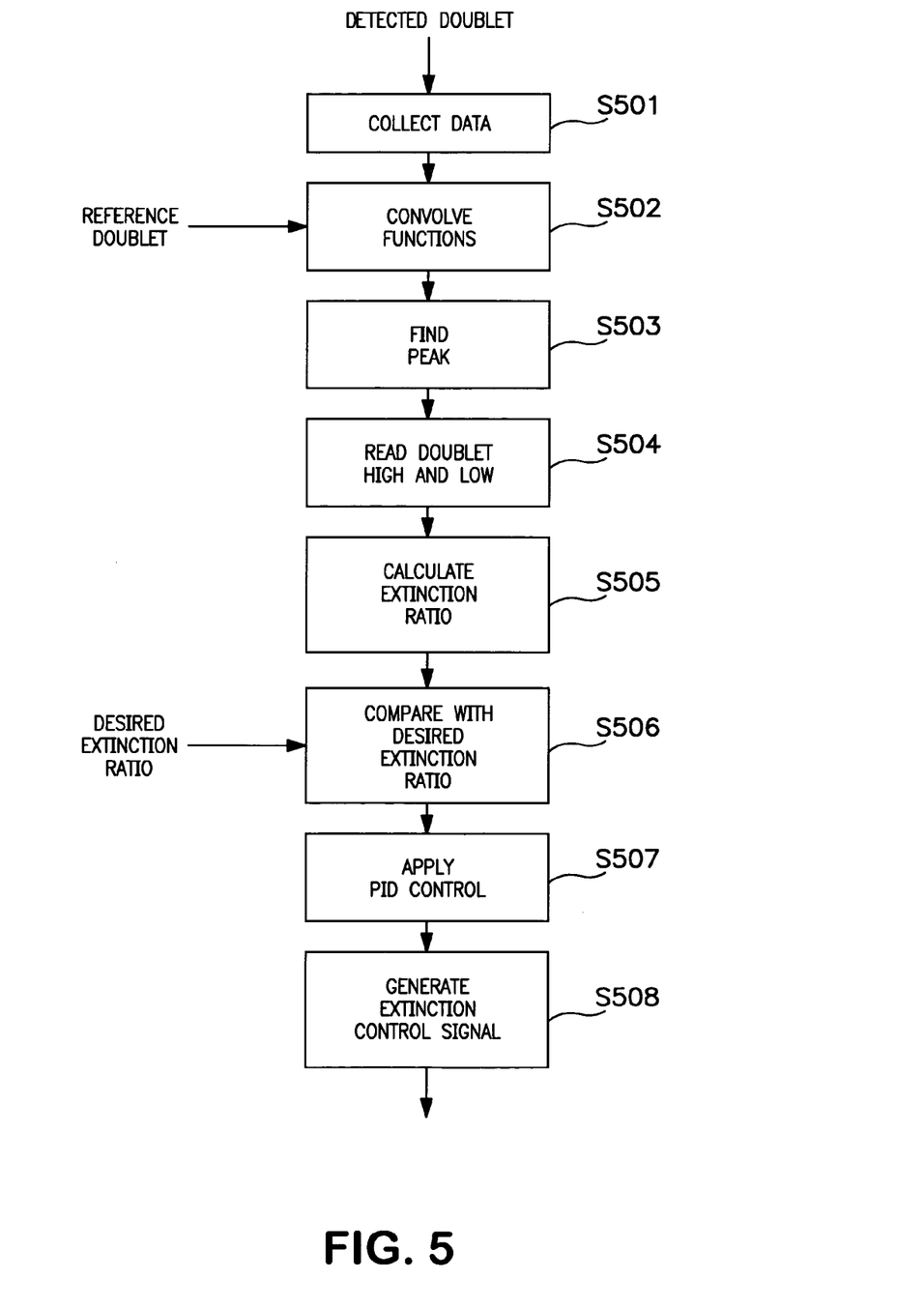
FIG. 5 is a flow chart of the steps of generating an extinction control signal by the computer shown in FIG. 3.

FIG. 5 is a flow chart of a program stored in the memory of the computer 32 generating the extinction control signal. In step S501 the stream of digital doublet signals from A/D converter are collected, and in step S502 the collected stream of digital doublet signals are convolved with a reference doublet signal provided from the user interface 36 to produce a convolved doublet signal. The convolution has the effect of averaging 125 microsecond time blocks so the A1 A2 doublet may be located. Details of the convolve function of S502 are set out in the flow chart of FIG. 6.

Figure 6:
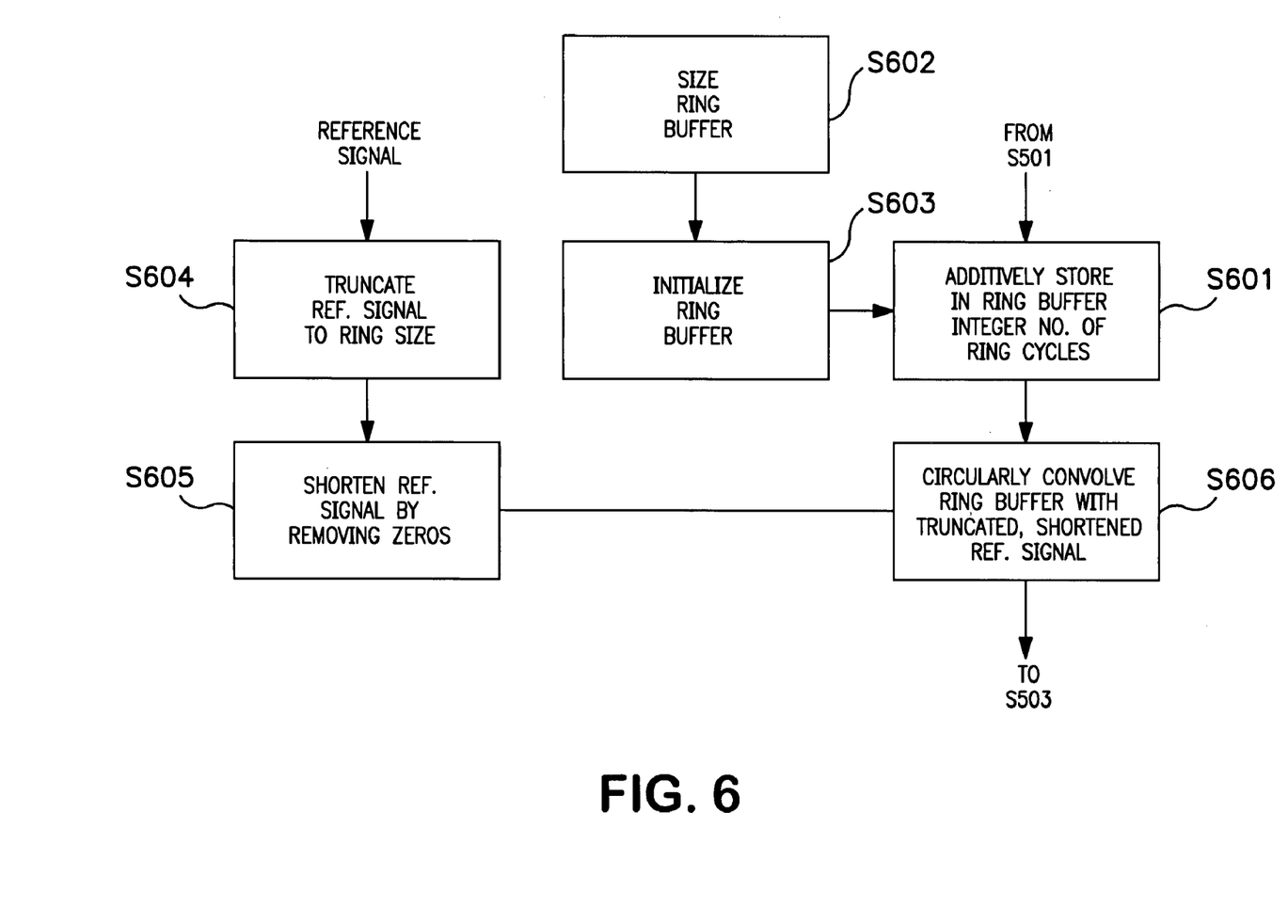
FIG. 6 is a detailed flow chart of the convolve function step of FIG. 5.

As shown in FIG. 6, in step S601 the collected stream of digital doublet signals are stored in a ring buffer (in the computer 32) sized for the repeat time between groups of A1 A2 bytes. In step S602 the buffer is sized for 125 micro seconds for this example. For a given measurement interval the ring values are initialized to zero, step S603. To effect the averaging needed to suppress the data bytes as compared to the A1 A2 bytes, the storage is done by adding new values to what ever is present in the ring as one processes around the ring in step S601. If the additive storage is performed for an integer number of circuits of the ring, and without any partial circuits of the ring, the average value is calculated by dividing all ring values by the same integer. As a ratio-ing later occurs between ring values, no integer division is needed to calculate the average for an N×125 microsecond storage interval, the N cancels out (N is an integer.).

In step S604 the reference signal is truncated to the ring size of the ring buffer, and in step S605 the frame size of the truncated reference signal is shortened by removing ZERO's occurring between successive reference signals. To find the unknown location of the A1 A2 bytes within the ring buffer, the reference doublet signal is circularly convolved with the contents of the ring buffer after an integer number of cycles of additive storage in step S606. The peak of the convolution marks the ring location of the A1 A2 bytes. Computational efficiency is gained by using the knowledge that the convolving signal is zero between A1 A2 signal times. The reference convolving function only needs to be as long as the A1 A2 shape in step S605.

Figure 7:
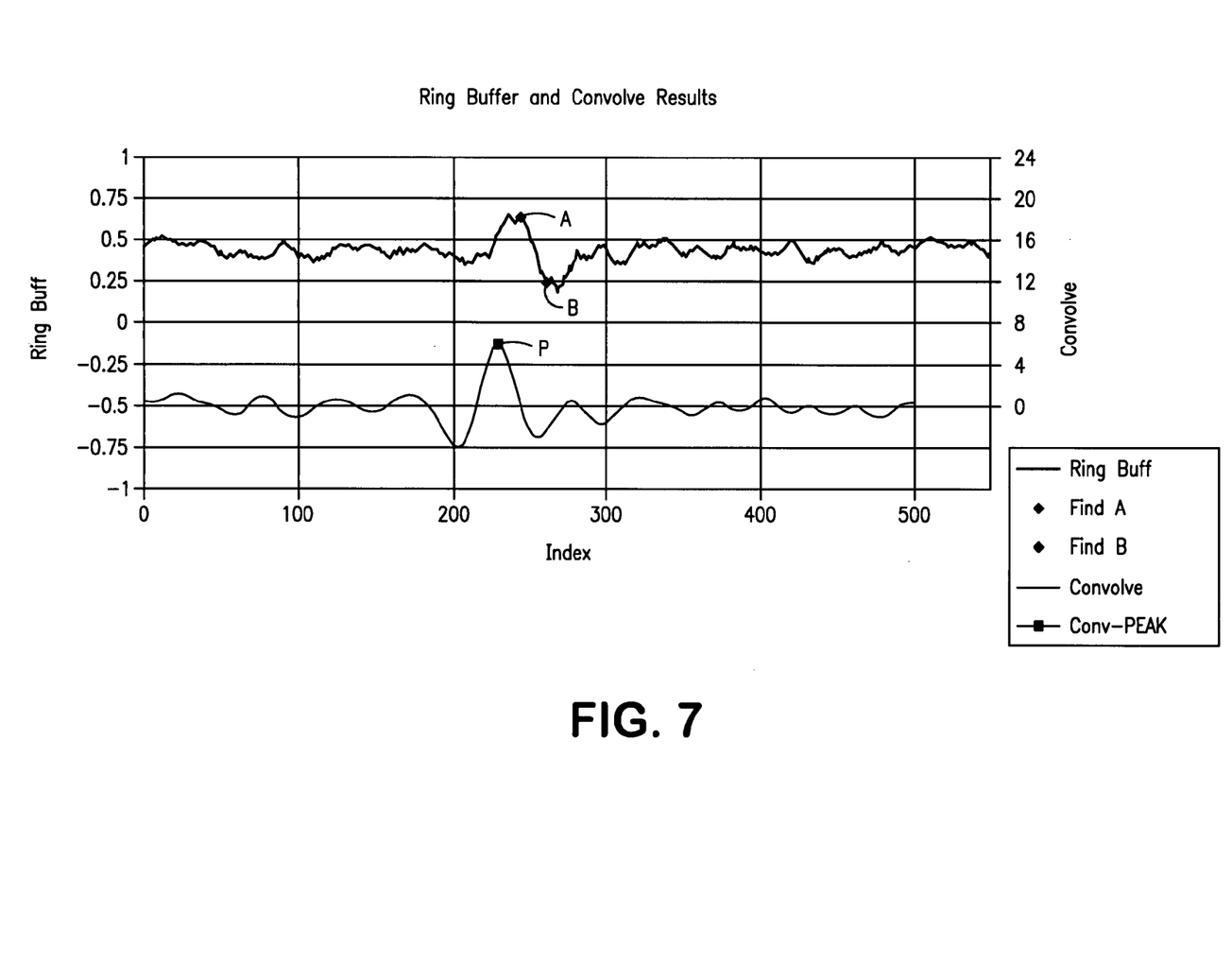
FIG. 7 illustrates waveforms of the ring buffer and convolve results.

Returning to FIG. 5, the peak of the convolved doublet signal is determined in step S503, indicating the location of the A1 A2 doublet. The location of the A1 portion is a fixed offset from the doublet location, +77 nanoseconds with referencing shown in FIG. 7. The A2 location is a different fixed offset from the doublet location +221 nanoseconds in FIG. 7. Using the location of A1 and A2, the ring values may now be read from the ring buffer in step S504, the A1 location being the HIGH or 'a' value, the location of A2 being the LOW or 'b' value as shown in FIG. 2. In step 505 the extinction ratio is calculated in accordance with formula 4) above. In step S506 the calculated extinction ratio is compared with a desired extinction ratio provided from user interface 36 to provide a comparison signal. In step S507 proportional integral differential (PID) control is applied to the comparison signal to account for the time of system operation for generating the comparison signal, with the extinction control signal then being generated at S508 for application via line 34 to the extinction control input 8 of the laser driver 6.

Thus, it is seen that the extinction ratio of the laser 12 is controlled based on detection of the bit patterns in the repetitive first and second sub-sections of the header of the data protocol signal which excites the laser. For example, the detection of the A1 and A2 framing bytes in the OC48 SONET optical protocol.

The present invention may be applicable to various constructions based on hardware and the corresponding processing. The processing may be, for example, described logically or expressed in software. Alternatively, it may be formed into an algorithm within the spirit and scope of the present invention, and the present invention may be applicable as hardware or an apparatus according to the above algorithm.

The present invention may be applicable to a system comprised of a plurality of devices (for example, a host computer, an interface, a reader, and a printer) or formed of only one device.

Also, the following modification may be made to fulfill the above-noted functions loaded with the foregoing embodiments of the present invention. Software program codes for implementing the above function may be installed in a computer within an apparatus connected to the various devices or in a computer within the system. Then, the various devices may be operated according to the program stored in the computer (a CPU or an MPU) within the system or the apparatus.

In this case, since the software program per se can fulfill the functions of the aforedescribed embodiments, the program codes per se and means for supplying the program codes to a computer, for example, a storage medium in which the program codes are stored, can constitute the present invention. The storage mediums for storing such program codes may include floppy disks, hard disks, optical disks, magnetic-optical disks, CD-ROMs, magnetic tape, non-volatile memory cards, and ROMs.

It is needless to say that the program codes installed in the computer memory may be included in the present invention if the functions of the aforedescribed embodiments can be implemented by operating the program codes in cooperation with an operating system (OS) run on a computer or with another application software program.

Further, the program codes may naturally be included in the present invention if the functions of the above-described embodiments can be achieved in the following manner. Namely, the program codes are stored in a memory provided for a feature expansion board of a computer or a feature expansion unit connected to a computer or a feature expansion unit connected to a computer, and then, a CPU or an MPU stored within the feature expansion board or the feature expansion unit completely or partially executes actual processing based on the program codes.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of calculating an extinction ratio of a laser, the method comprising:

applying a sequence of data protocol signals, each having a header section and a data section, to the laser for exciting the laser, with the header section having at least first and second sub-sections, the first sub-section having a first predetermined bit pattern, and the second sub-section having a second predetermined bit pattern which is different than the first predetermined bit pattern, the laser outputting a sequence of optical signals, each having bit patterns corresponding to the first and second predetermined bit patterns of a corresponding sequence of data protocol signals;

converting the sequence of optical signals to a sequence of electrical signals;

low-pass filtering the sequence of electrical signals to pass a sequence of analog signals, each having a HIGH portion corresponding to filtering the first predetermined bit pattern in the first sub-section of the header, and having a LOW portion corresponding to filtering the second predetermined bit pattern in the second sub-section of the header;

converting the sequence of analog signals to a sequence of digital signals;

convolving the sequence of digital signals with a reference digital signal to generate a convolved signal;

finding a peak of the convolved signal corresponding to an alignment between the first and second sub-sections and the reference digital signal;

measuring the digital signal at the first and second sub-sections based on the alignment; and calculating an extinction ratio based on the measured digital signal at the first and second sub-sections.

2. The method according to claim 1, further comprising comparing the extinction ratio calculated in the calculating with a desired extinction ratio to generate an extinction control signal for controlling an extinction ratio of the laser.

3. The method according to claim 1, wherein the first predetermined bit pattern has a preponderance of ONE bits, and the second predetermined bit pattern has a preponderance of ZERO bits.

4. The method according to claim 1, wherein the first, predetermined bit pattern has on average six ONE bits and two ZERO bits per eight bits, and the second predetermined bit pattern has on average two ONE bits and six ZERO bits per eight bits.

5. The method according to claim 1, wherein the data protocol signals are SONET protocol signals, and the first sit-section has an A1 framing byte and the second sub-section has an A2 framing byte.

6. The method according to claim 1, wherein at least one of the digital signals and the reference digital signal includes a doublet signal.

7. The method according to claim 1, further comprising controlling an extinction ratio of the laser based on the extinction ratio calculated in the calculating.

8. The method according to claim 7, wherein the calculating includes performing a predetermined formula to calculate the extinction ratio based on the measured digital signal at the first and second sub-sections, wherein the method further comprises comparing the extinction ratio calculated in the calculating to a predetermined extinction ratio, and wherein the controlling is performed based on a result of the comparing.

9. The method according to claim 1, wherein the convolving circularly convolves the sequence of digital signals with the reference digital signal to generate the convolved signal.

10. The method according to claim 1, further comprising collecting the sequence of digital signals in a ring buffer, and wherein the convolving circularly convolves the sequence of digital signals collected in the ring buffer with the reference digital signal.

11. An apparatus for calculating an extinction ratio of a laser, comprising:

an input device adapted to excite the laser with a sequence of data protocol signals, each having a regularly repetitive header section and a data section, with the header section having at least first and second sub-sections, the first sub-section having a first predetermined bit pattern, and the second sub-section having a second predetermined bit pattern which is different than the first predetermined bit pattern, the laser outputting a sequence of optical signals, each having bit patterns corresponding to the first and second predetermined bit patterns of a corresponding sequence of data protocol signals;

a first converter adapted to convert the sequence of optical signals to a sequence of electrical signals;

a low-pass filter adapted to low-pus filter the sequence of electrical signals to pass a sequence of analog signals, each having a HIGH portion corresponding to filtering the first predetermined bit pattern in the first sub-section of the header, and having LOW portion corresponding to filtering the second predetermined bit pattern in the second subsection of the header;

a second converter adapted to convert the sequence of analog signals to a sequence of digital signals;

a convolver adapted to convolve the sequence of digital signals with a reference digital signal to generate a convolved signal;

a first measuring device adapted to find a peak of the convolved signal corresponding to an alignment between the first and second sub-sections and the reference digital signal;

a second measuring device adapted to measure the digital signal at the first and second sub-sections based on the alignment; and a calculator adapted to calculate an extinction ratio based on the digital signal measured at the first and second sub-sections.

12. The apparatus according to claim 11, further comprising a comparator adapted to compare the extinction ratio calculated by the calculator with a desired extinction ratio to generate an extinction control signal for controlling an extinction ratio of the laser.

13. The apparatus according to claim 11, wherein the first predetermined bit pattern has a preponderance of ONE bits and the second predetermined bit pattern has a preponderance of ZERO bits.

14. The apparatus according to claim 11, wherein the first predetermined bit pattern has on average six ONE bits and two ZERO bits per eight bits, and the second predetermined bit pattern has on average two ONE bits and six ZERO bits per eight bits.

15. The apparatus according to claim 11, wherein the data protocol signals arc SONET protocol signals, and the first sub-section has an A1 framing byte and the second sub-section has an A2 framing byte.

16. The apparatus according to claim 11, wherein at least one of the digital signals and the reference digital signal includes a doublet signal.

17. The apparatus according to claim 11, further comprising a controller that controls an extinction ratio of the laser based on the extinction ratio calculated by the calculator.

18. The apparatus according to claim 17, wherein the calculator performs a predetermined formula to calculate the extinction ratio based on the digital signal measured at the first and second sub-sections, wherein the apparatus further comprises a comparator that compares the extinction ratio calculated by the calculator to a predetermined extinction ratio, and wherein the controller controls the extinction ratio of the laser based on a result obtained by the comparator.

19. The apparatus according to claim 11, wherein the convolver circularly convolves the sequence of digital signals with the reference digital signal to generate the convolved signal.

20. The apparatus according to claim 11, further comprising a ring buffer that collects the sequence of digital signals, and wherein the convolver circularly convolves the sequence of digital signals collected in the ring buffer with the reference digital signal.

21. A computer program product embodying a program that when executed by a processor implements a method of calculating an extinction ratio of a laser excited with a sequence of data protocol signals, each having a regularly repetitive header section and a data section, with the header section having at least first and second sub-sections, the first sub-section having a first predetermined bit pattern, and the second sub-section having a second predetermined bit pattern which is different than the first predetermined bit pattern, the laser outputting a sequence of optical signals, each having bit patterns corresponding to the first and second predetermined bit patterns of the data protocol signals, wherein the sequence of optical signals are converted to a sequence of electrical signals, the sequence of electrical signals is low-pass filtered to pass a sequence of analog signals, each having a HIGH portion corresponding to filtering the first predetermined bit pattern in the first sub-section of the header, and having a LOW portion corresponding to filtering the second predetermined bit pattern in the second sub-section of the header, and the sequence of analog signals is converted to a sequence of digital signals, the program comprising:

convolver program code to convolve the sequence of digital signals with a reference digital signal to generate a convolved signal;

finder program code to find a peak of the convolved signal corresponding to an alignment between the first and second sub-sections and the reference digital signal;

measurer program code to measure the digital signal at the first and second sub-sections based on the alignment; and     calculator program code to calculate an extinction ratio based on the digital signal measured at the first and second sub-sections.

22. The computer program product according to claim 21, wherein the program further comprises comparing program code to compare the extinction ratio calculated by the calculator program code with a desired extinction ratio to generate an extinction control signal for controlling an extinction ratio of the laser.

23. The computer program product according to claim 21, wherein the first predetermined bit pattern has a preponderance of ONE bits, and the second predetermined bit pattern has a preponderance of ZERO bits.

24. The computer program product according to claim 21, wherein the first predetermined bit pattern has on average six ONE bits and two ZERO bits per eight bits, and the second predetermined bit pattern has on average two ONE bits and six ZERO bits per eight bits.

25. The computer program product according to claim 21, wherein the data protocol signals are SONET protocol signals, and the first sub-section has an A1 framing byte and the second sub-section has an A2 framing byte.

26. The computer program product according to claim 21, wherein at least one of the digital signals and the reference digital signal includes a doublet signal.

27. The computer program product according to claim 21, further comprising controller program code to control an extinction ratio of the laser based on the extinction ratio calculated by the calculator program code.

28. The computer program product according to claim 27, wherein the calculator program code performs a predetermined formula to calculate the extinction ratio based on the digital signal measured at the first and second sub-sections, wherein the computer program product further comprises comparator program code to compare the extinction ratio calculated byte calculator program code to a predetermined extinction ratio, and wherein the controller program code controls the extinction ratio of the laser based on a result obtained by the comparator program code.

29. The computer program product according to claim 21, wherein the convolver program code circularly convolves the sequence of digital signals with the reference digital signal to generate the convolved signal.

30. The computer program product according to claim 21, further comprising collector program code to collect the sequence of digital signals in a ring buffer, and wherein the convolver program code circularly convolves the sequence of digital signals collected in the ring buffer with the reference digital signal.

\* \* \* \* \*

UNITED STATES PATENT AND TRADEMARK OFFICE
CERTIFICATE OF CORRECTION

PATENT NO. : 6,993,459 B2
APPLICATION NO. : 09/905948
DATED : January 31, 2006
INVENTOR(S) : John C. Carrick It is certified that error appears in the above-identified patent and that said Letters Patent is hereby corrected as shown below:

ON COVER PAGE AT (56) FOREIGN PATENT DOCUMENTS

"01183872 A" should read --01-183872 A--;
"02226001 A1" should read --02-226001 A1--; and
"04276673 A" should read --04-276673 A--.

COLUMN 7

Line 16, "first," should read --first--;
Line 23, "sit-section" should read --sub-section--; and
Line 64, "low-pus" should read --low-pass--.

COLUMN 8

Line 34, "arc" should read --are--.

COLUMN 10

Line 22, "byte" should read --by the--.

Signed and Sealed this

Twenty-sixth Day of September, 2006

JON W. DUDAS
*Director of the United States Patent and Trademark Office*